United States Patent

Shiitani et al.

[11] Patent Number: 6,040,836
[45] Date of Patent: *Mar. 21, 2000

[54] MODELLING METHOD, MODELLING SYSTEM, AND COMPUTER MEMORY PRODUCT OF THE SAME

[75] Inventors: Shuichi Shiitani; Masaki Watanabe, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,438

[22] Filed: Apr. 30, 1996

[30] Foreign Application Priority Data

Sep. 29, 1995 [JP] Japan .................................. 7-253056

[51] Int. Cl.⁷ .................................................. G06T 15/10

[52] U.S. Cl. ........................... 345/427; 345/420; 345/429

[58] Field of Search .................................... 395/127, 120, 395/128, 129, 130, 124, 122; 345/427, 420, 428, 429, 430, 424, 422

[56] References Cited

U.S. PATENT DOCUMENTS

| 4,858,150 | 8/1989 | Aizawa et al. | 364/522 |
|---|---|---|---|
| 4,935,879 | 6/1990 | Ueda | 364/522 |
| 5,379,371 | 1/1995 | Usami et al. | 395/128 |
| 5,412,762 | 5/1995 | Kondo | 395/120 |
| 5,475,799 | 12/1995 | Yoshioka et al. | 395/120 |
| 5,598,515 | 1/1997 | Shashua | 345/422 |

FOREIGN PATENT DOCUMENTS

| 2-150968 | 6/1990 | Japan . |
|---|---|---|
| 3-138784 | 6/1991 | Japan . |
| 3-278095 | 12/1991 | Japan . |
| 6-348815 | 12/1994 | Japan . |

OTHER PUBLICATIONS

Shashua, "Projective structure from uncalibrated images: structure from motion and recognition"; IEEE Transactions on Pattern Analysis and Machine Intelligence, v. 16, n. 8, p. 778(12), Aug. 1994.

Morikawa et al., "3–D structure extraction coding of image sequences", IEEE, 1990.

Sawhney et al., "Image description and 3–D reconstruction form image trajectories of rotational motion"; IEEE Transactions on Pattern Analysis and Machine Intelligence, v. 15, n. 9, p. 885(13), Sep. 1993.

Abstract and Translation of Japanese Patent Application JP 6–348815, Usami Yoshiaki, et al., Method For Setting Three–Dimensional Model of Building Aspect in CG System, Dec. 22, 1994.

Primary Examiner—Mark R. Powell
Assistant Examiner—Motilewa Good-Johnson
Attorney, Agent, or Firm—Staas & Halsey

[57] ABSTRACT

A modelling method, a modelling system and a computer memory product create a three-dimensional model of an object in a computer screen. A two-dimensional image and an existing model are positioned within a virtual three-dimensional space. The two-dimensional image corresponds to a three-dimensional object and the existing model corresponds to the two-dimensional image. The existing model is then corrected so that the image of the three-dimensional object represented in the two-dimensional image is in accordance with a projection image of the existing model. This creates a first model from a first portion of the three-dimensional object and a second model from a second portion of the three-dimensional object. The first model and the second model are then combined and projected into the two-dimensional image with no change in their respective positions.

21 Claims, 26 Drawing Sheets

FIG. 8

| MODEL NUMBER | | ELEMENT NUMBER | | |
|---|---|---|---|---|
| M1 | 0 | POINT (P) | 0<br>1<br>:<br>4<br>:<br>7 | → MODEL NUMBER: 1<br>POINT NUMBER<br>SIDE NUMBER: 6<br>SURFACE NUMBER — FIG. 7A |
| | | SIDE (E) | 0<br>1<br>:<br>4<br>:<br>11<br>12 | → MODEL NUMBER: 1<br>POINT NUMBER<br>SIDE NUMBER: 6<br>SURFACE NUMBER — FIG. 7B |
| | | SURFACE (S) | 0<br>1<br>2<br>:<br>5 | → MODEL NUMBER: 1<br>POINT NUMBER<br>SIDE NUMBER<br>SURFACE NUMBER: 3 — FIG. 7C |
| M2 | 1 | POINT (P) | 0<br>1<br>2<br>:<br>6<br>7 | |
| | | SIDE (E) | 0<br>1<br>:<br>6<br>7<br>:<br>11 | → MODEL NUMBER: 0 \| 0<br>POINT NUMBER: 4<br>SIDE NUMBER: \| 4<br>SURFACE NUMBER |
| | | SURFACE (S) | 0<br>1<br>2<br>3<br>4<br>5 | → MODEL NUMBER: 0<br>POINT NUMBER<br>SIDE NUMBER<br>SURFACE NUMBER: 2 |

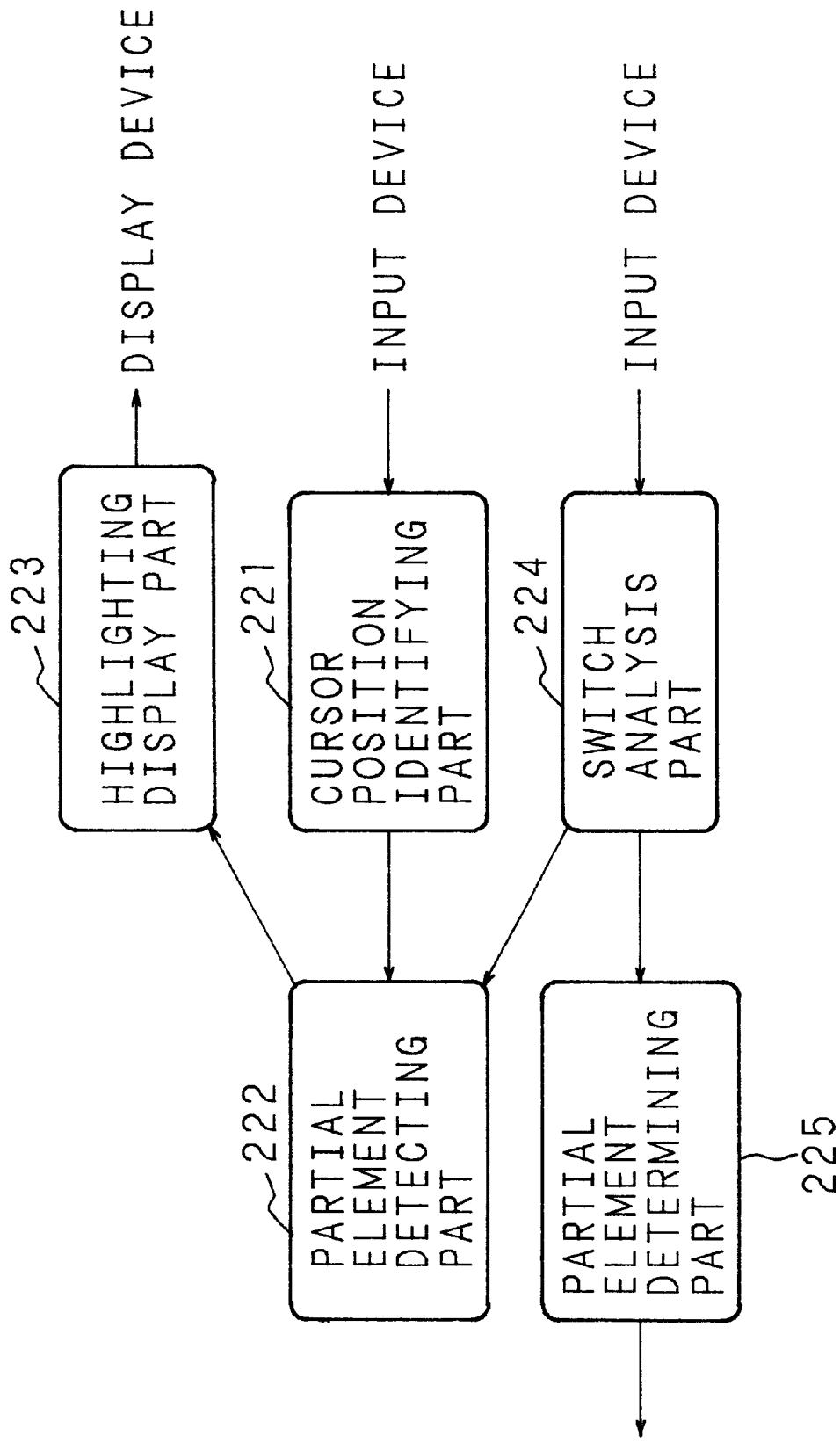

MODELLING METHOD, MODELLING SYSTEM, AND COMPUTER MEMORY PRODUCT OF THE SAME

BACKGROUND OF THE INVENTION

1. Field of the Invention

The present invention relates to modelling for creating a configuration model in three-dimensional (hereinafter refferred to as 3D) computer graphics.

2. Description of the Related Art 3D computer graphics (3D-CG) are a technique for three-dimensionally displaying a real object or a virtual object on a screen on the basis of a three-dimensional configuration model of the object. By establishing a three-dimensional space inside a computer, it is possible to display scenery viewed from an optional point of view. Simulation/presentation games are a typical application of 3D-CG.

It is necessary to register models such as a configuration, a surface attribute and a motion in a computer to realize a three-dimensional display. A displaying quality depends on a model. While automatic modelling of a real object is under development, at present, automatic modelling is insufficient for a practical use. Modelling for creating a model of a complex configuration by combining a plurality of models through dialog between a computer and a human being (operator) is therefore desired.

A known modelling method uses real image photographing of a real object to create a three-dimensional configuration model of the object. A two-dimensional image including three-dimensional structure information, such as a perspective view, may be used instead of the real image. In a modelling system adopting this modelling method, an existing model and a real image are arranged in a virtual three-dimensional space (global coordinate space) to display on a screen a monitor image which shows a positional condition. Existing models are models having basic configurations (basic models) such as a cubic configuration, a circular cylindrical configuration, a conical configuration and a spherical configuration or object models of incomplete conditions (target object models). A monitor image is obtained by synthesizing a real image and a projection image of an existing model onto a plane which includes the real image. An operator operating the modelling system corrects the existing model so that the projection image of the existing model accords with an object in the real image. For example, an operator deforms the projection image by means of dragging of a mouse (in a similar manner to that for correcting a figure in a two-dimensional CAD). While operating, the operator can visually observe a model by instinct. This modelling method is superior to a method which requires to input an appearance size of an object on the basis of a design drawing or surveyed data, in terms of operation easiness.

Modification of a model in a monitor image is disclosed in Japanese Patent Application Laid-Open No. 6-348815 (1994). Japanese Patent Application Laid-Open No. 3-138784 (1991) describes to select a model which is similar to an object from a plurality of existing models and to use the same.

By the way, a method which requires to assort a plurality of models to create a model of a target object (hereinafter referred to as an object model) is widely used in computer graphics.

However, in the case where a real image is utilized for modelling, there is no example in which the method is applied. In other words, since an object model must be created by correcting only one existing model in a conventional technique, to make it possible to create a complex object model, it is necessary to prepare various types of existing models in advance.

SUMMARY OF THE INVENTION

The present invention has been made to solve these problems above. Accordingly, an object of the present invention is to provide for a modelling method, a modelling system and a computer memory product which correct and combine a plurality of existing models while utilizing a two-dimensional image such as a real image, to create a complex model in an easy manner.

A method of combining a plurality of models is used for modelling which utilizes a real image. If the configuration of a target object is complex, an operator divides the target object into a plurality of portions each having a simple configuration, and after creating a model for each portion, combines the models for the respective portions (hereinafter referred to as partial models) to each other. The combining of the models means to change relative positions of partial models in a virtual three-dimensional space or to deform a partial model.

When a partial model is moved without changing the size thereof, a gap is generated between the partial model and the real image on the screen. That is, consistency between the partial model and the object is deteriorated. To obtain a correct object model, therefore, it is necessary to correct the partial model after moving the same. Coordinate conversion for maintaining consistency is performed during combining, so that such a labor is omitted.

A modelling method and a computer memory product according to the present invention are each characterized in comprising the steps of: positioning a two-dimensional image including three-dimensional structure information regarding an object and a corresponding existing model in a virtual three-dimensional space; correcting the existing model so that an image of the object in the two-dimensional image accords with a projection image of the existing model to thereby create a first model which is a model of a first portion of the object, and a second model which is a model of a second portion of the object; and combining the first and the second models so that respective projection conditions of the first and the second models onto the two-dimensional image are practically the same before and after said step combining.

The modelling method and the computer memory product according to the present invention are each characterized in that the first and the second models are moved relative to each other and combined with each other.

Further, the modelling method and the computer memory product according to the present invention are each characterized in that the first model is fixed while the second model is moved.

Further, the modelling method and the computer memory product according to the present invention are each characterized in that the first model is moved so that a point, a line and a surface thereof are integrated with the second model in order.

This makes it easy to create a complex three-dimensional image by dividing the two-dimensional image such as a real image into a plurality of portions each having a simple configuration.

Further, the modelling method and the computer memory product according to the present invention are each characterized in that a history of the combining is stored and combining processes are performed in turn under maintaining the combining relation based on the history.

Hence, a desired model is created by combining less times.

A modelling system according to the present invention is characterized in comprising: first monitor display control means for positioning in a virtual three-dimensional space a two-dimensional image including three-dimensional structure information regarding an object, a first model which is a model of a first portion of the object, and a second model which is a model of a second portion of the object, to thereby display mutual positional relation thereof within a first region on the screen; and model combining means for combining the first and the second models so that given combining requirements are satisfied and respective projection conditions of the first and the second models onto the two-dimensional image are practically the same before and after said step of combining.

This realizes an operation environment for dividing the two-dimensional image such as a real image into a plurality of portions each having a simple configuration to thereby create a complex three-dimensional image in an easy manner.

The modelling system according to the present invention is characterized in further comprising restraint generating means for storing the combining requirements and in that the model combining means combines the first and the second models so that a combining requirement which is designated by the restraint generating means is satisfied. This realizes an operation environment for creating a desired model by combining less times.

The modelling system according to the present invention is characterized in further comprising second monitor display control means for displaying the positional relation between the first and the second models which are combined with each other by the model combining means within a second region on the screen which does not overlap the first region. This makes it easy to designate portions to be combined.

The modelling system according to the present invention is characterized in further comprising guide display control means for highlighting a partial element which is selected from partial elements of the first and the second models in accordance with a combining requirement, one by one in order every time the selecting of the partial element is performed. This makes it possible to efficiently designate portions to be combined.

The modelling system according to the present invention is characterized in further comprising: image memory means for storing a plurality of the two-dimensional images which contain different information from one another; image displaying means for arranging and displaying the two-dimensional images on the screen; and image selecting means for selecting one of the two-dimensional images as an image to be displayed within the first region, in accordance with an instruction being inputted. This allows to display the plurality of the two-dimensional images on one display screen and to select a needed one of the two-dimensional images, and therefore, increases the perfectness of a three-dimensional image model.

The above and further objects and features of the invention will more fully be apparent from the following detailed description with accompanying drawings.

BRIEF DESCRIPTION OF THE DRAWINGS

FIG. 8 is an explanatory diagram showing the contents of combining restraint data which correspond to FIGS. 6 and 7;

FIG. 9 is a functional block diagram of an input analysis part used in the preferred embodiment;

DESCRIPTION OF THE PREFERRED EMBODIMENTS

Figure 1:
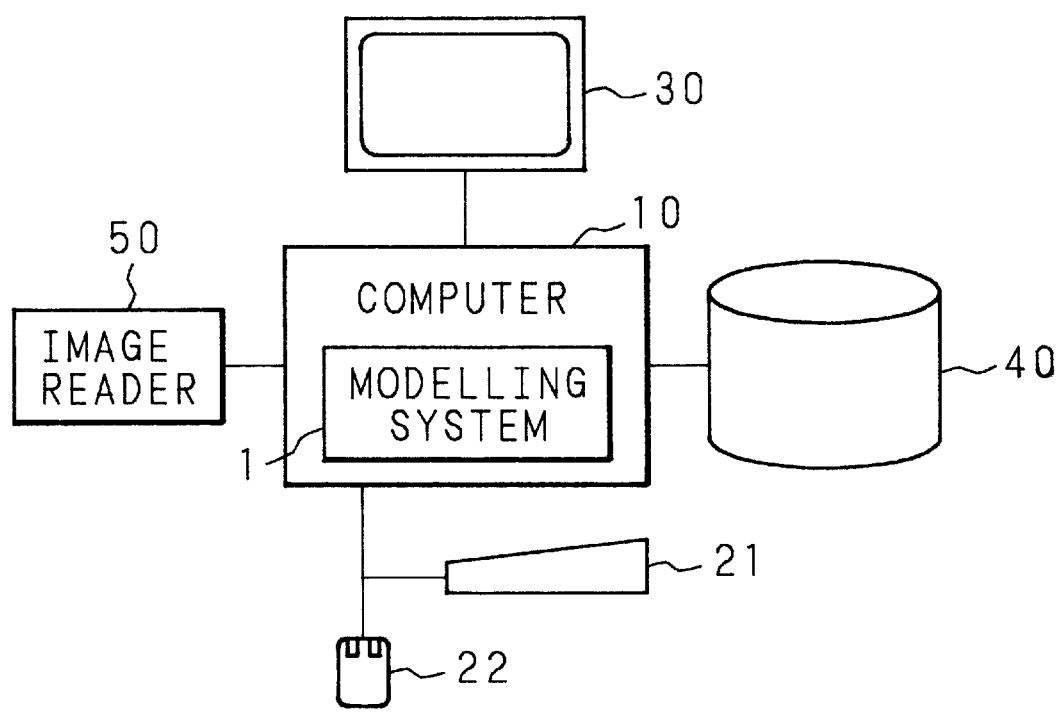
FIG. 1 is a view showing an example of hardware which is used for modelling in the present invention.

FIG. 1 is a view showing an example of hardware which is used for modelling.

Dialog type modelling requires a computer system CS which includes a man-machine interface. The computer system CS shown in FIG. 1 comprises a computer 10 incorporating a circuit device for graphics, a key board 21, a mouse 22, a display 30, an auxiliary memory device 40, and an image reader 50 for inputting two-dimensional image information. Software for realizing functions of a modelling system 1 is installed in the computer 10. The mouse 22 may be replaced with other pointing devices such as a track ball. The image reader 50 may be replaced with a video camera, to enter image information regarding an object in the computer 10. An image may also be supplied to the computer 10 from a readable medium such as an optical disk.

Figure 2:
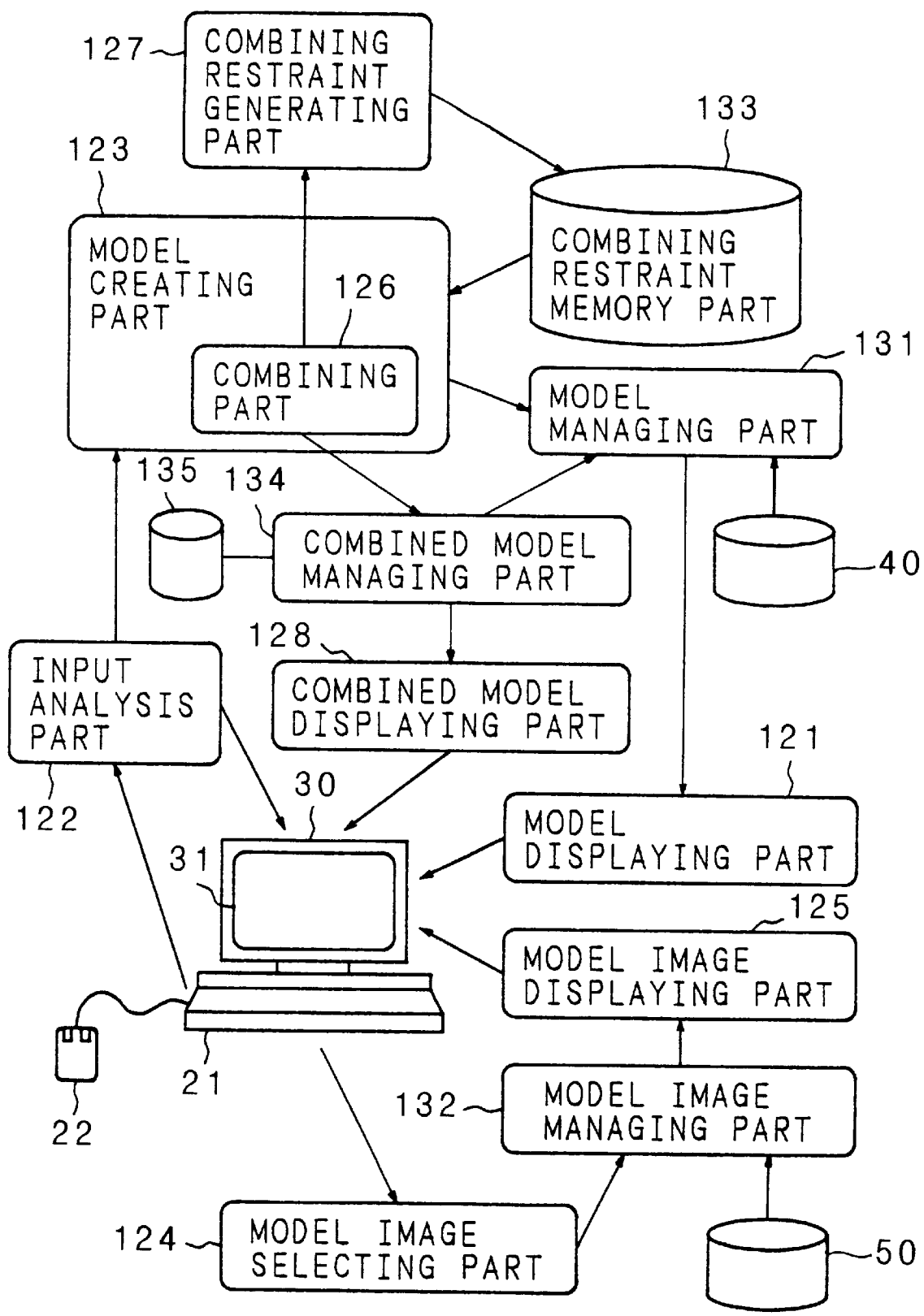
FIG. 2 is a functional block diagram of the modelling system of FIG. 1.

FIG. 2 is a functional block diagram of the modelling system 1.

A model managing part 131 manages existing models (i.e., basic models and object models which are created before). A model is defined by a group of parameters such as a three-dimensional configuration, the size and a position within a three-dimensional space. A model except for the object model which is being created is stored in the auxiliary memory device 40.

A model image managing part 132 manages image data in a pixel unit outputted by the image reader 50. In the following, it is assumed that a plurality of real images photographing an object which is to be modelled are read and managed under the control of the model image managing part 132.

A model image selecting part 124 arranges and displays the plurality of the real images on a screen 31 of the display 30, urging an operator to select a real image. A model image displaying part 125 displays one of the real images which is selected by the operator, as a model image for modelling.

A model displaying part 121 projects a model which is designated by the operator upon the model image. On the screen 31, a monitor image is displayed which shows a positional relation between the model image and the model within the three-dimensional space.

An input analysis part 122 analyzes the contents of an operation of an inputting device (the key board 21 or the mouse 22), and informs a model creating part 123 of an instruction from the operator. In addition, the input analysis part 122 performs a highlighting operation to improve the easiness of operations if needed.

The model creating part 123 updates the model in accordance with an instruction from the operator. In response to updating, the model displaying part 121 deletes a projection image of the model before updating, overlaps a projection image of the model after updating the model image, and displays the same.

Utilizing the functions of the respective parts above, the operator can complete a model of the object. In short, the operator performs appropriate correction (moving, rotating, expanding, reducing, deforming) so that the object within the model image (object image, to be strict) accords with the model on the screen 31. When a complex object model is to be created, a plurality of partial models are created by repeatedly according a portion of the object with the model.

A combining part 126 combines two partial models. By Performing coordinate conversion which will be described later, it is possible to maintain consistency between each partial model and the model image almost as it is. A combining restraint generating part 127 generates combining restraint data which are used to consider a result of combining during subsequent correction of the model (including combining). The combining restraint data are accumulated within a combining restraint memory part 133. Correction by the model creating part 123 is restricted by the combining restraint data.

When first combining, for example, a surface of one partial model to a surface of another partial model, and secondly combining, for example sides of the models to each other, the two surfaces which are integrated with each other by the first combining must not be separated from each other by the second combining. The combining restraint data are used to accord the sides while keeping the surfaces combined to each other. Managing of the combining restraint data may be performed by the model managing part 131.

A combined model managing part 134 temporarily stores each model after combining, from the start to the end, of the combining operation in storage unit 135. In response to an instruction to end the combining operation, the model which is obtained by the most recent combining is supplied to the model managing part 131, as the most recent object model. The model managing part 131 updates the object model.

A combined model displaying part 128 displays positional conditions of two partial models which are to be combined to each other on the screen 31, so as not to overlap a display region in which an image synthesizing the model image and the projection image of the object model is displayed. That is, a window for combining is opened separately from a window for monitoring the object model (i.e., a group of partial models before combining in this case).

The operator can freely rotate the object model within the window for combining to confirm the positional relation between the partial models. Further, the operator can make it easier to designate portions to be combined, by rotating. Since the object model which accords with the model image is held by the model managing part 131, it is not necessary to take care of a displacement between the model image and the object model due to rotating.

Figure 3:
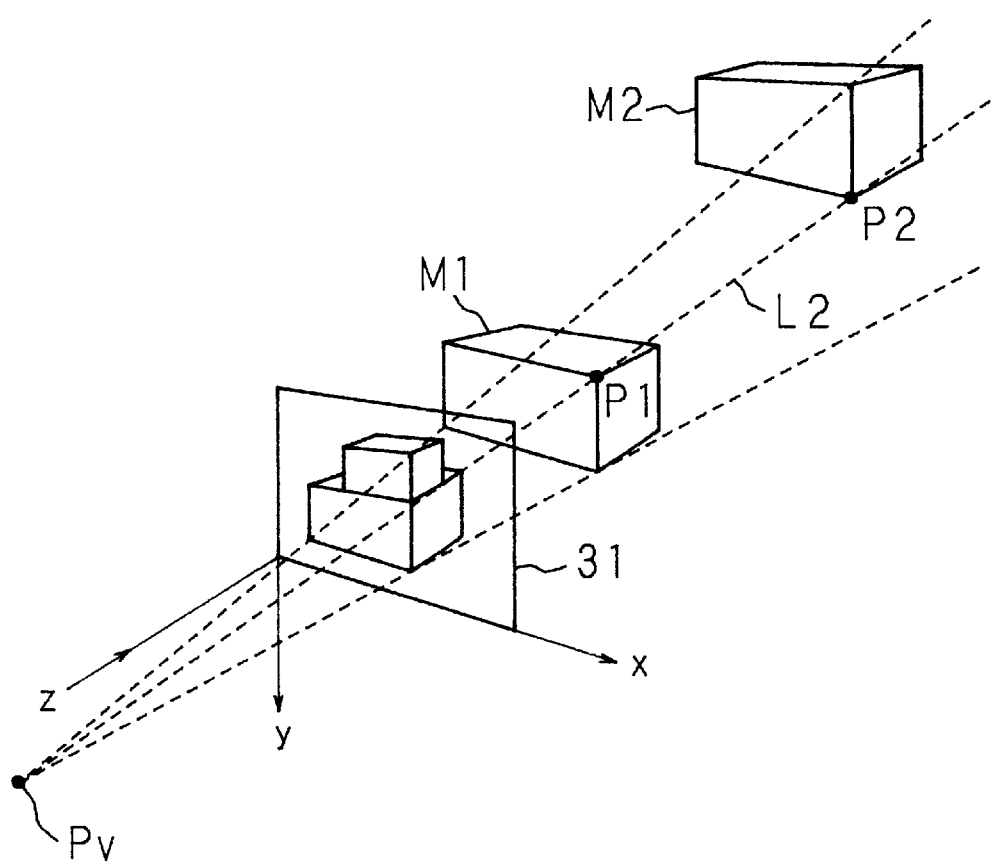
FIGS. 3 and 4 are views for describing the contents of computation for combining according to a preferred embodiment.
Figure 4:
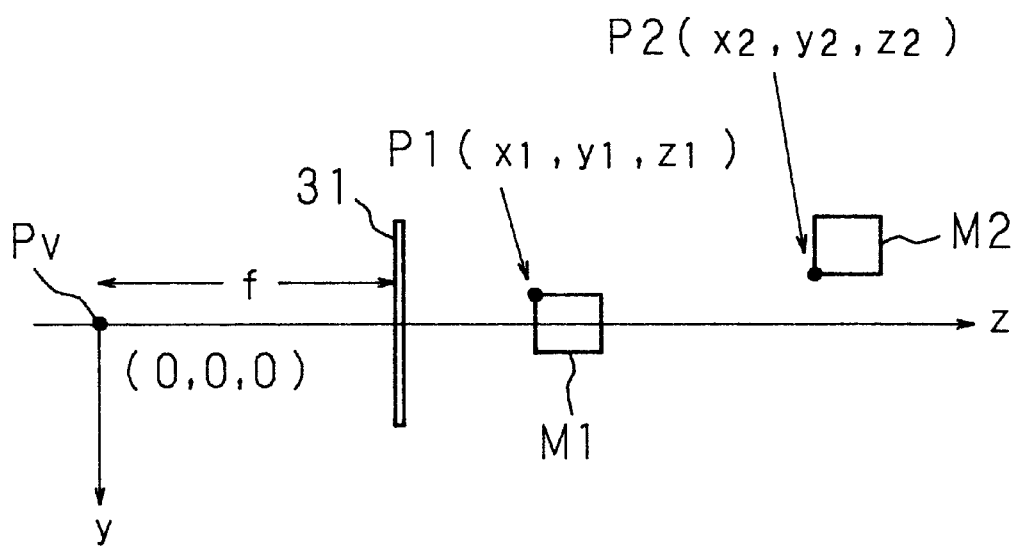

FIGS. 3 and 4 are views for describing the contents of computation for combining.

FIG. 3 shows a relation between the arrangement of two models M1 and M2 and a projection image on the screen 31. FIG. 4 shows an upright transfer image on a zy-plane.

In the screen 31, the model M2 is on the model M1 and a point P1 accords with a point P2. However, in the three-dimensional space, the models M1 and M2 are separated from each other. Although the models M1 and M2 have the same size, in the screen 31, the model M2 looks smaller than the model M1.

An orthogonal coordinate system is applied to the three-dimensional space. The origin is a point of view Pv, a z-axis is in a direction from the point of view Pv toward the screen 31 (i.e., in a depth direction), and the screen 31 is an xy-plane. An indication f denotes a distance between the point of view Pv and the screen 31, $(x_1, y_1, z_1)$ designates the coordinates of the point $P_1$, and $(X_2, Y_2, Z_2)$ denotes the coordinates of the point P2.

The coordinates $(X_1, Y_1)$ and $(X_2, Y_2)$ of points which are obtained by projecting the respective points P1 and P2 onto the screen 31 are:

$X_1 = f(x_1/z_1)$
$Y_1 = f(y_1/z_1)$
$X_2 = f(x_2/z_2)$
$Y_2 = f(y_2/z_2)$

For according the points P1 and P2 with each other, when the model M2 alone is moved while fixing the model M1, an equation expressing a line L2 passing through the origin and the point P2 is:

$(x/x_2) = (y/y_2) = (z/z_2)$

The coordinates $(x_3, y_3, z_3)$ of an intersection P3 of a perpendicular line (not shown) from the point P1 to the line L2 and the line L2 are:

$x_3 = x_2 (x_1 x_2 + y_1 y_2 + z_1 z_2)/(x_2^2 + y_2^2 + z_2^2)$
$y_3 = y_2 (x_1 x_2 + y_1 y_2 + z_1 z_2)/(x_2^2 + y_2^2 + z_2^2)$
$z_3 = z_2 (x_1 x_2 + y_1 y_2 + z_1 z_2)/(x_2^2 + y_2^2 + z_2^2)$

First, the point P2 is shifted to the point P3, and conversion for moving the point P2 (P3) parallel to the point P1 is then performed. By performing similar conversion on all apexes of the model M2, it is possible to combine the models M1 and M2 while minimizing a distance to move on the screen 31. Combining is expressed as the following formula:

$$P = \{(x_1 x_2 + y_1 y_2 + z_1 z_2)/(x_2^2 + y_2^2 + z_2^2)\} P_0 +$$

$$\left\{ \begin{pmatrix} x_1 \\ y_1 \\ z_1 \end{pmatrix} - (x_1 x_2 + y_1 y_2 + z_1 z_2)/(x_2^2 + y_2^2 + z_2^2) \begin{pmatrix} x_2 \\ y_2 \\ z_2 \end{pmatrix} \right\}$$

where $P_o$: coordinates before combining

P: coordinates after combining

Figure 5:
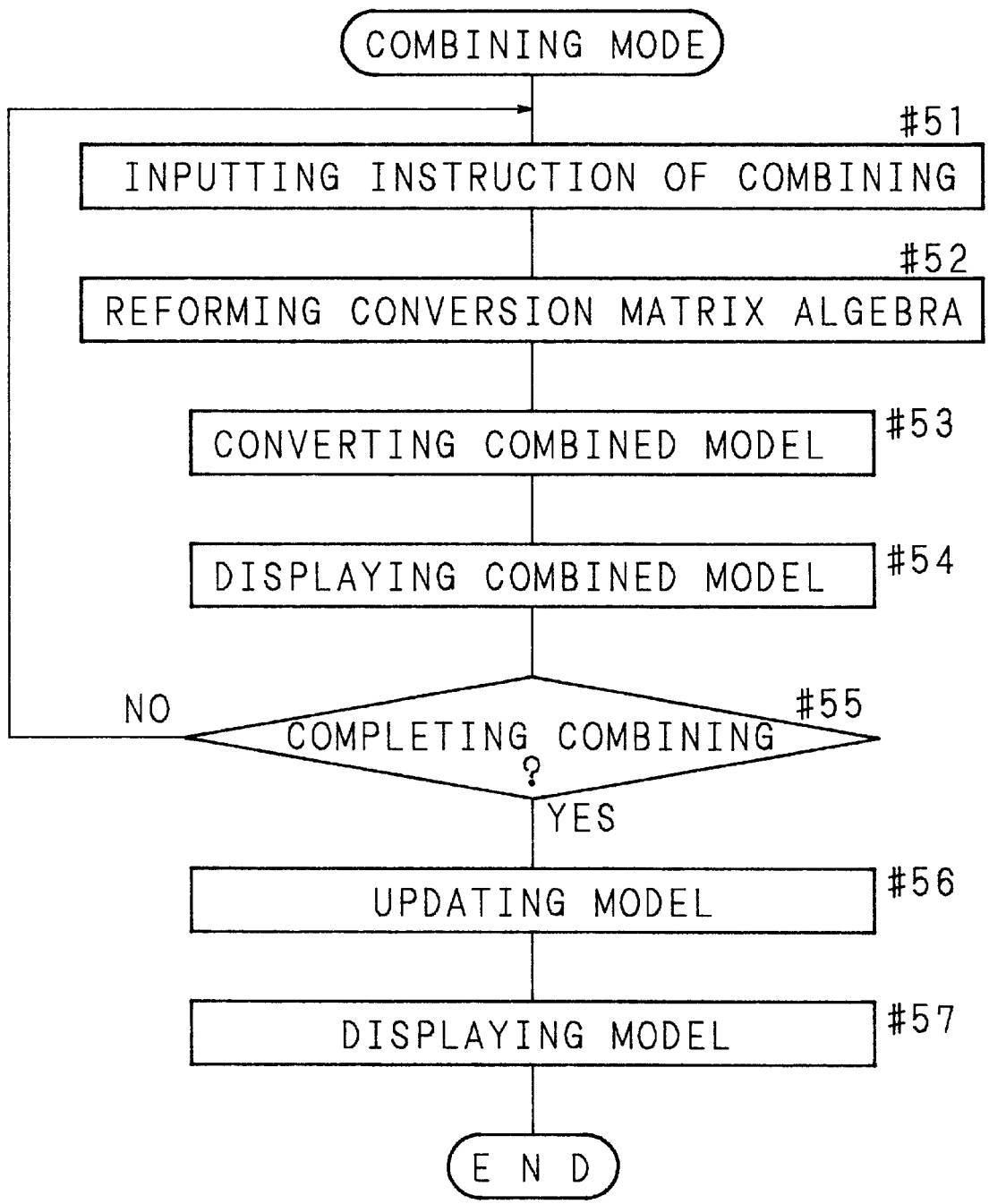
FIG. 5 is a flow chart showing a system operation in a combining mode in the preferred embodiment.

FIG. 5 is a flow chart showing a system operation in a combining mode in the present preferred embodiment. The input analysis part 122 receives an instruction from the operator (Step #51), and the combining part 126 performs conversion matrix algebra for according portions which are designated by the operator with each other (Step #52). Following this, the combining part 126 applies a result of the conversion matrix algebra to two partial models which are stored by the combined model managing part 134 as partial models to be combined to each other (Step #53). The combined model displaying part 128 displays a partial model which is obtained after combining (Step #54). In response to an instruction to complete combining (Step #55), the model managing part 131 updates the object model on the basis of a result of combining (Step #56), and the model displaying part 121 displays the updated object model as it is overlapped on the model image (Step #57). If the instruction requires to rotate, the combining part 126 performs computation for changing the point of view upon a target to be combined.

FIGS. 6 and 7A through 7C are views showing an example of gradual combining, and FIG. 8 is a schematic diagram showing the contents of combining restraint data D127 which correspond to FIGS. 6 and 7A through 7C.

Figure 6:
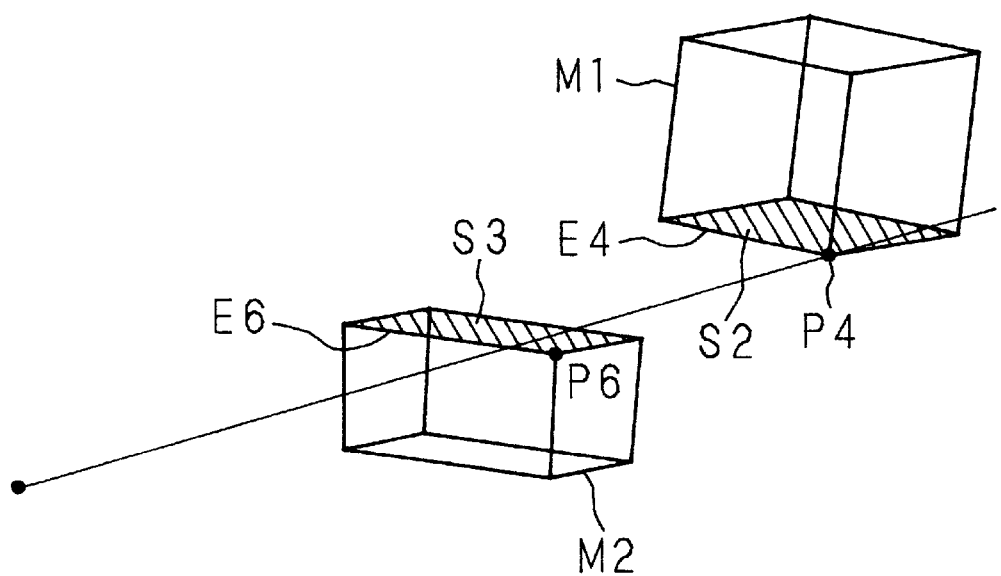
FIGS. 6 and 7A through 7C are views showing an example of gradual combining in the preferred embodiment.

In FIG. 6, the models M1 and M2 are separated from each other in a vertical direction and the depth direction. From this state, a state as that shown in FIG. 7C is eventually obtained in which the model M1 is on the model M2 in such a manner that a side E4 of the model M1 accords with a side E6 of the model M2. If a bottom surface S2 of the model M1 is accorded with a top surface S3 of the model M2 at first, the sides E4 and E6 do not necessarily accord with each other. Therefore, combining must be performed gradually.

Figure 7A:
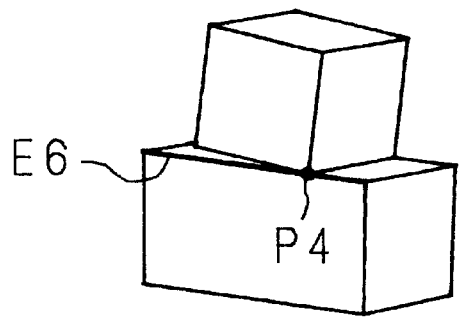

First, as shown in FIG. 7A, an apex P4 of the model M1 is accorded with the side E6 of the model M2. At this stage, as shown in FIG. 8, a point number 4 of the model M1 (number 0) is associated with a side number 6 of the model M2 (number 1), thereby generating the combining restraint data D127 which associates the point number 4 of the model M1 with the side number 6 of the model M2. That is, the combining restraint generating part 127 writes a pointer at a corresponding number of a data structure which is formed for each model (i.e., a matrix expressing a combined state of points, sides and surfaces). In an initial condition, NULL is written at all numbers. NULL denotes that the portion is not combined to no portion.

Figure 7B:
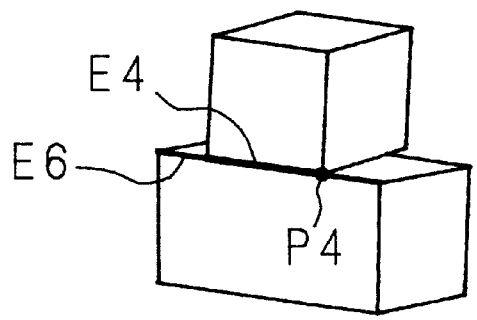
Figure 7C:
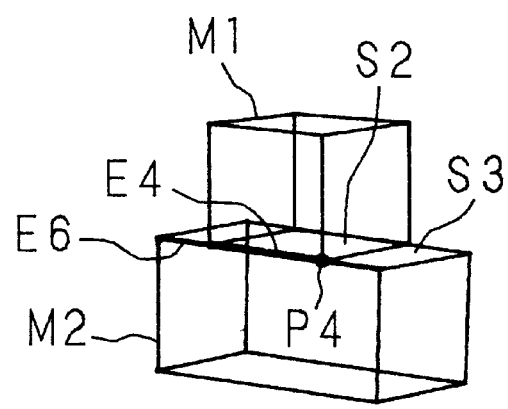

Next, as shown in FIG. 7B, for according the side E4 and the side E6 with each other, conversion matrix algebra for satisfying the present combining requirement (i.e., when the side E4 is accorded with the side E6) and the previous combining requirement which is designated by the combining restraint data D127 (i.e., the condition requiring that the apex P4 accords with the side E6) is performed. Data linking the point number 4 of the model M1 to the side number 6 of the model M2 are added to the combining restraint data D127.

At last, as shown in FIG. 7C, the bottom surface S2 is accorded with the top surface S3. Combining for this pur- pose is also restricted by the combining requirement for the previous combining. Data linking a surface number 2 of the model M1 to a surface number 3 of the model M2 are added to the combining restraint data D127.

In the modelling system 1, of two models which are combined to each other, one in which an element (apex, side or surface) to be combined is designated by the operator earlier than in the other model is moved during combining. The model in which an element to be combined is designated by the operator later is fixed at this stage.

Figure 10:
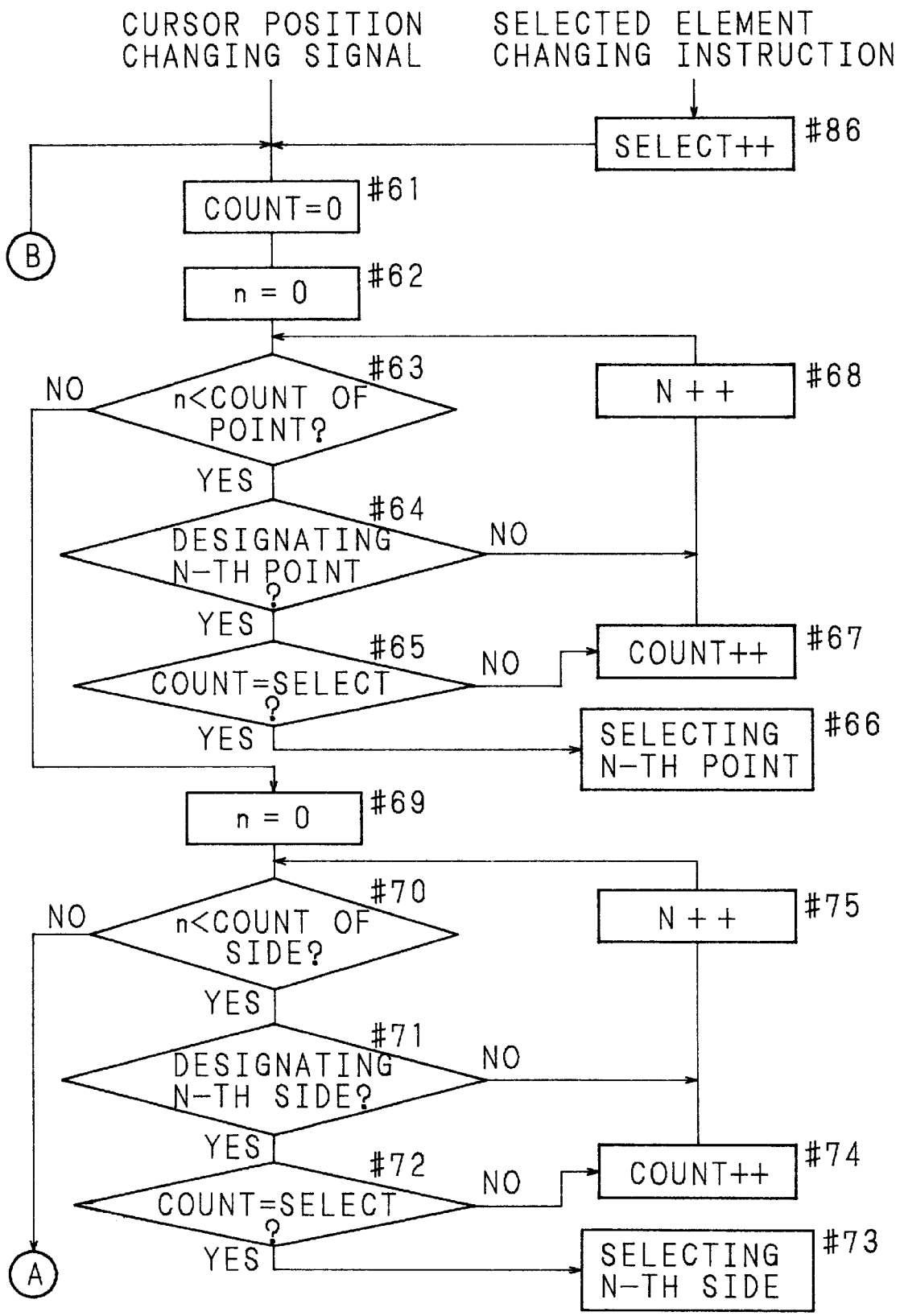
FIGS. 10 and 11 are flow charts of an operation of a partial element detecting part of FIG. 9.
Figure 11:
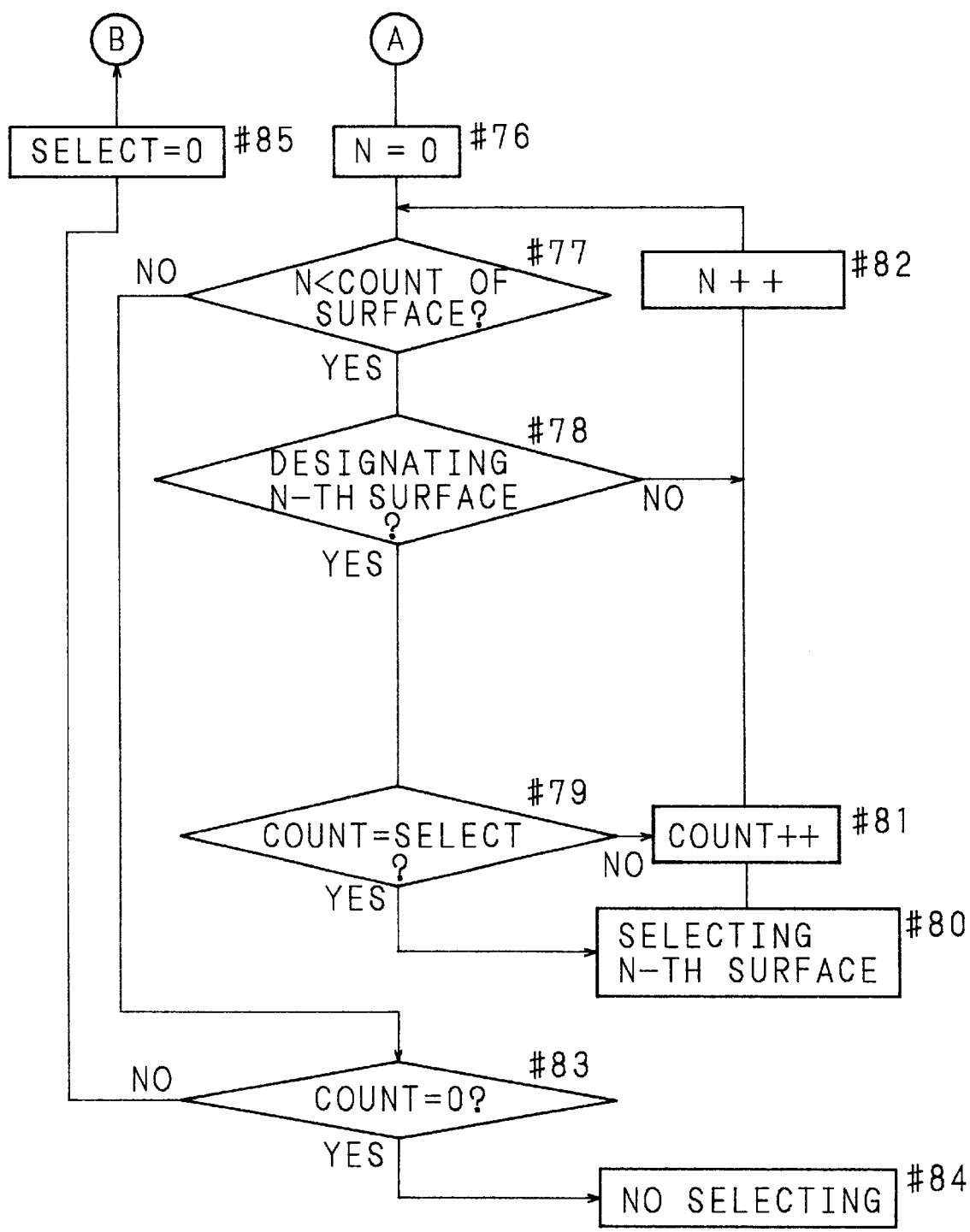

FIG. 9 is a functional block diagram of the input analysis part 122, and FIGS. 10 and 11 are flow charts of an operation of a partial element detecting part 222.

A cursor position identifying part 221 shown in FIG. 9 detects a cursor position which follows the movement of the mouse 22, and informs the partial element detecting part 222 of detected coordinates.

The partial element detecting part 222 checks if the cursor is over a model in the screen 31. If there is a partial element (a point, a side or a surface of the model) which corresponds to the cursor position, information which specifies the corresponding partial element is supplied to highlighting display part 223. If there are a plurality of partial elements which correspond to the cursor position, one piece of information is supplied the highlighting display part 223. Every time an instruction to change a partial element to be selected is received from a switch analysis part 224, the plurality of the partial elements which correspond to the cursor position are supplied to the highlighting display part 223, one by one in an order of points, sides and surfaces.

The highlighting display part 223 highlights a partial element which is designated by the partial element detecting part 222. A partial element is emphasized by means of a change in the color, a change in the luminance, blinking, combinations of the same, etc.

The switch analysis part 224 analyzes a signal from the inputting device. When a decision signal is inputted, the switch analysis part 224 informs a partial element determining part 225 of selection of a highlighting partial element by the operator. When a change signal is inputted, the switch analysis part 224 informs the partial element detecting part 222 of a change instruction. The partial element determining part 225 provides the model creating part 123 with the information received from the switch analysis part 224.

Since partial elements which correspond to the cursor position following the movement of the mouse 22 are highlight one after another by means of concerted operations of the respective parts, the operator can easily confirm a designated target. Further, even the positional relation between the partial elements in the depth direction are hard to recognize on the screen 31, since the partial elements are selected through repeated clicking until a desired partial element is highlighted, it is not always necessary to confirm a designated target while changing the posture of the model, thereby contributing to effective operations.

In FIGS. 10 and 11, a variable count expresses at which place one element among one or a plurality of partial elements corresponding to the cursor position is positioned as counted from the screen side within the three-dimensional space. A variable select expresses at which place a desired element among one or a plurality of partial elements corresponding to the cursor position is positioned as counted from the screen side.

When the cursor position is changed, the partial element detecting part 222 clears the variable count (Step #61, #62). The partial element detecting part 222 calculates the coordinates of all apexes of a displayed model in the screen one by one, and checks whether the coordinates of an n-th point accord with the cursor position (Steps #63, #64, #68). When the coordinates of all apexes do not accord with the cursor position (Steps #63), similar processing is performed on sides (Steps #69–#72). When one apex accords with the cursor position and this apex is the desired element (count=select) (Step #65), the apex is outputted as a detection result (Step #66). If the apex is not the desired element (count<select), the variable count is incremented and the processing is continued (Step #67).

When one side accords with the cursor position and this side is the desired element, this side is outputted as a detection result (Step #73). If this side is not the desired element, the variable count is incremented and the processing is continued (Steps #74, #75).

When all sides do not accord with the cursor position, processing is performed on surface as performed on the apexes and the sides (Steps #76–#79). When all partial elements do not accord with the cursor position, such a situation is reported to the highlighting display part 223 (Steps #83, #84), or the processing is repeated from the beginning with select =0 (Step #85).

When an instruction to change a partial element to be selected is given (Step #86), the processing is started from the beginning after incrementing the variable select. This allows to sequentially highlight partial elements (corresponding to the cursor position) which are positioned in the depth direction with respect to the screen 31.

Now, a specific example of modelling by the modelling system 1 will be described.

Figure 12:
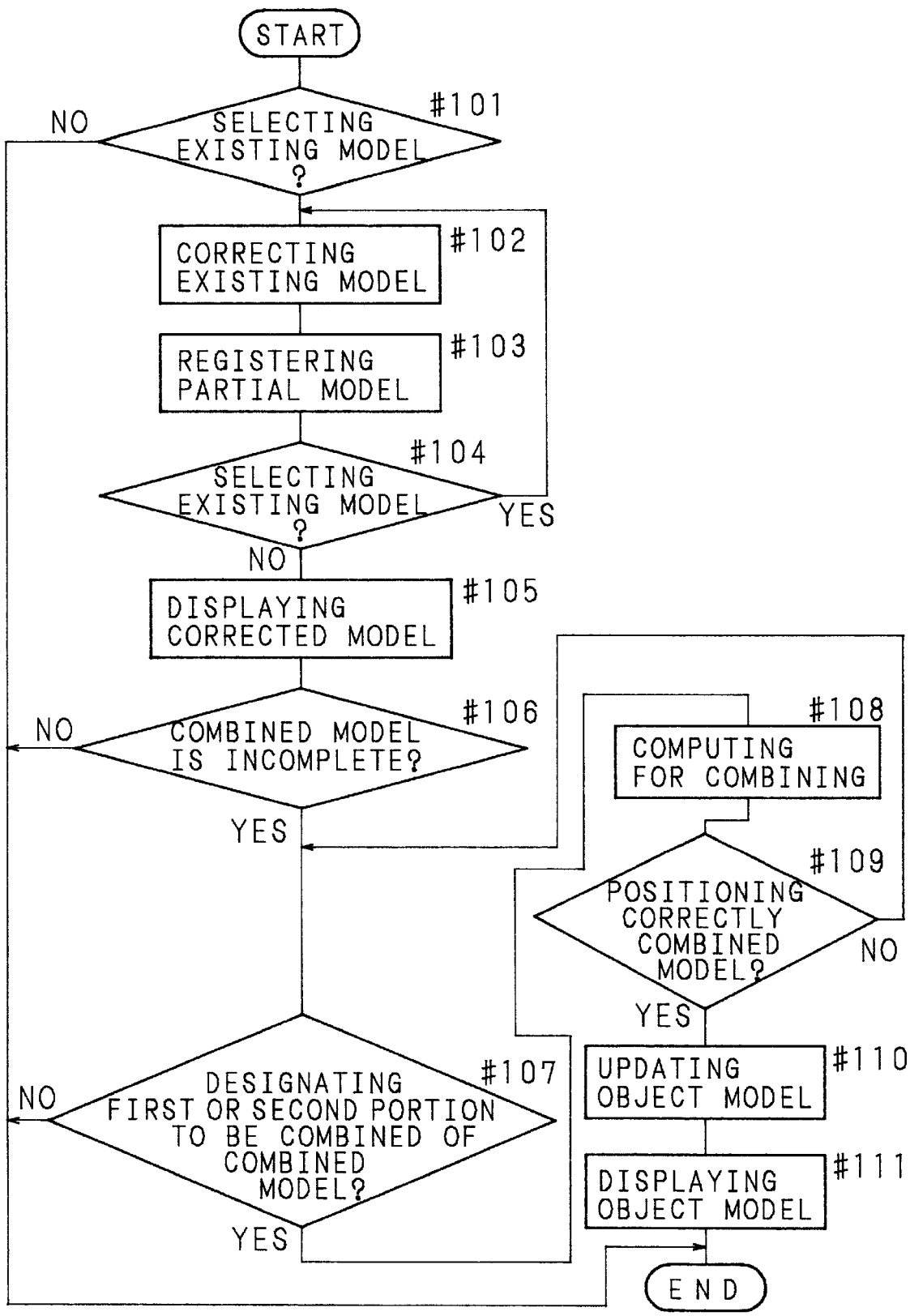
FIG. 12 is a flow chart showing a sequence of the operation in the preferred embodiment.
Figure 13:
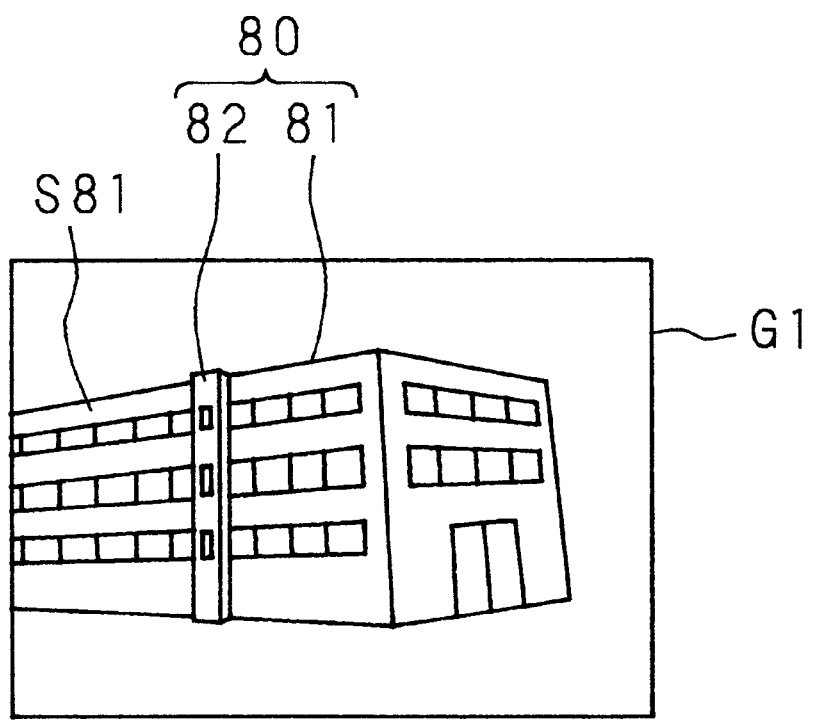
FIG. 13 is a view showing a model image which is used in the preferred embodiment.

FIG. 12 is a flow chart showing a sequence in the preferred embodiment. The sequence of modelling will be described with reference to FIG. 12. FIG. 13 is a view showing a model image G1 in the preferred embodiment. In FIG. 13, an approximately rectangular building 80 is an object to be modelled. The building 80 comprises a main part 81 having a rectangular shape which elongates in a horizontal direction, and an emergency staircase portion (hereinafter referred to as stairs) 82 having a rectangular shape which elongates in a vertical direction.

Using the model image G1, an object model (three-dimensional model) of the building 80 is created with being described a sequence of creating later. The model image G1 is a picture photographing the building 80 from a right-hand position to an exterior surface S81 which includes the stairs 82 of the main part 81. In the model image G1, the exterior surface S81 is partially lacked. In other words, it is not possible to obtain a perfect object model with only the model image G1. Therefore, in reality, it is necessary to correct an object model which is created using the model image G1, utilizing a picture which is taken at a position which is different from the model image G1.

FIGS. 14 through 17 are views for describing a sequence of creating a partial model. In FIGS. 14 through 17, the model image G1 is shown as it is simplified.

The operator creates a model of the main part 81 and a model of the stairs 82 and combines the models.

Figure 14:
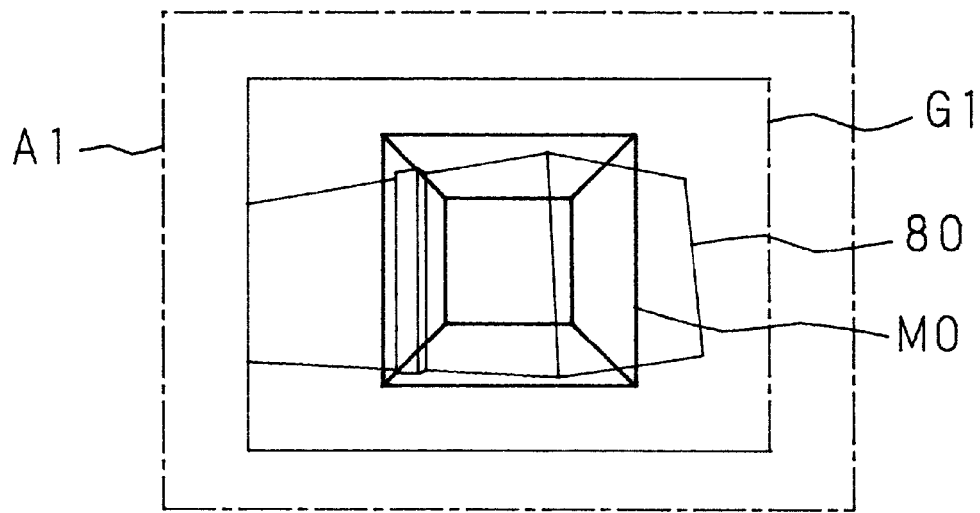
FIGS. 14 to 17 are views for describing a sequence of creating a partial model in the preferred embodiment.

In FIG. 14, the model image G1 and a cubic model (basic model) M0 are displayed in a wire frame form in a first monitor region A1 on the screen 31. In the modelling system 1, models such as cubic, cylimder, prisms, cones, prism cones, balls, regular n-hedrons are prepared as basic models. After displaying a list of the names or the symbol figures of these shapes, the operator selects a proper model (Step #101). FIG. 14 shows the contents which are displayed immediately after a model is selected.

At the stage shown in FIG. 14, the model M0 is positioned right in front of the screen 31. The outer square in the model M0 expresses a front surface to the screen 31 while the inner square expresses a back surface to the screen 31 in FIG. 14.

The operator corrects the model M0 so that the model M0 accords with the building 80 (Step #102). When the model M0 is to be corrected into a rectangle, for instance, one surface is picked and dragged to extend or reduce four sides which are perpendicular to the picked surface. In a correction mode which allows the model creating part 123 to receive correction operations, as shown in FIG. 15, a spherical wire frame model (guide polygon) 90 which makes it easy to understand the positional condition of the model is displayed within the first monitor region A1.

Figure 15:
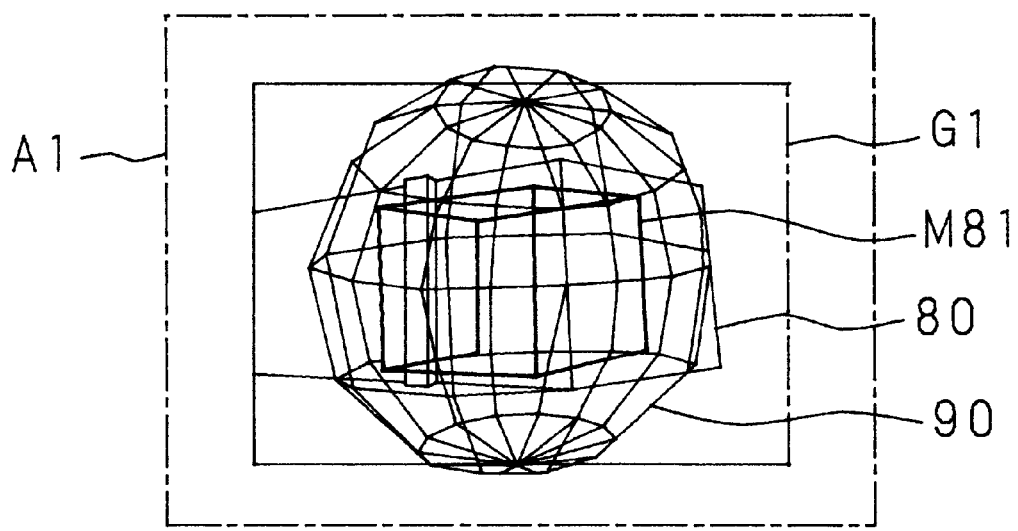
Figure 16:
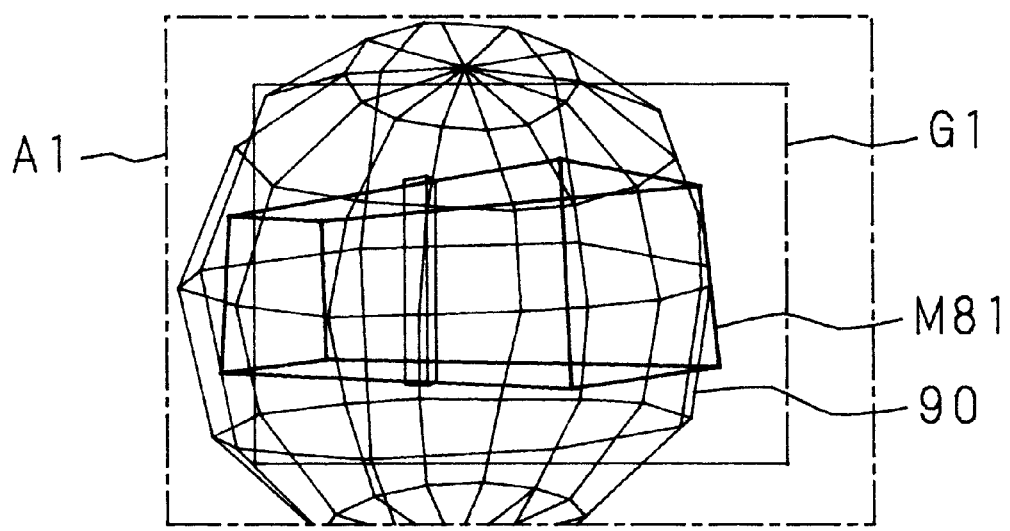

At the stage shown in FIG. 15, a model M81 which is obtained by rotating the model M0 is created. At the stage shown in FIG. 16, the model (partial model) M81 which accords with the main part 81 is created.

Figure 17:
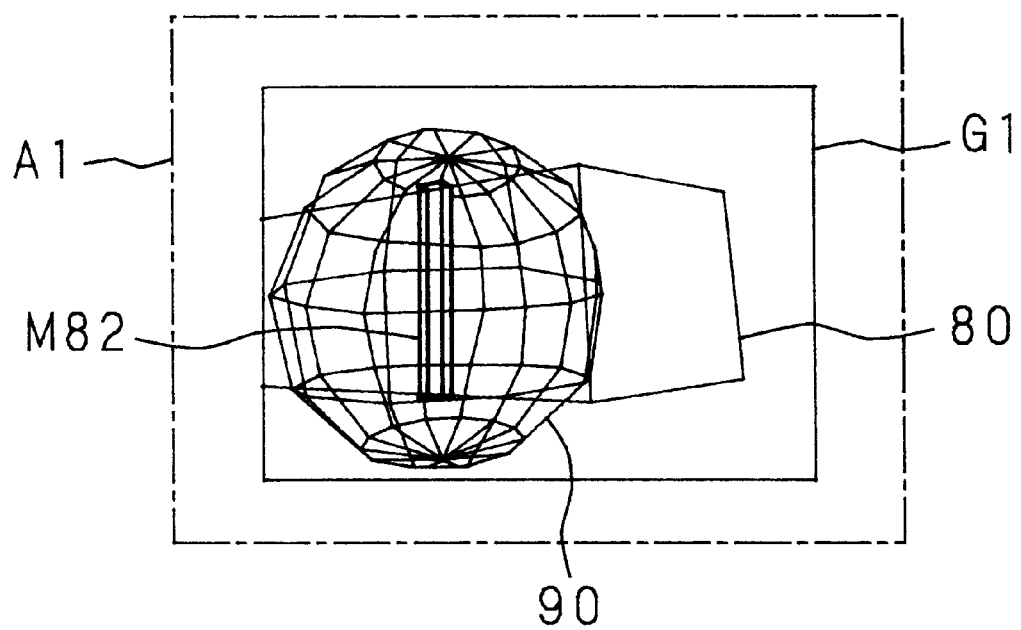

When the partial model M81 is completed, the operator registers the partial model M81 once (Step #103). Following this, to create a model for the stairs 82, the model M0 is retrieved once again (Step #104). Correction is performed as performed on the main part 81 (Step #102), and a partial model M82 is registered (Step #103). FIG. 17 shows a condition where the model for the stairs 82 (partial model) M82 is completed.

Figure 18:
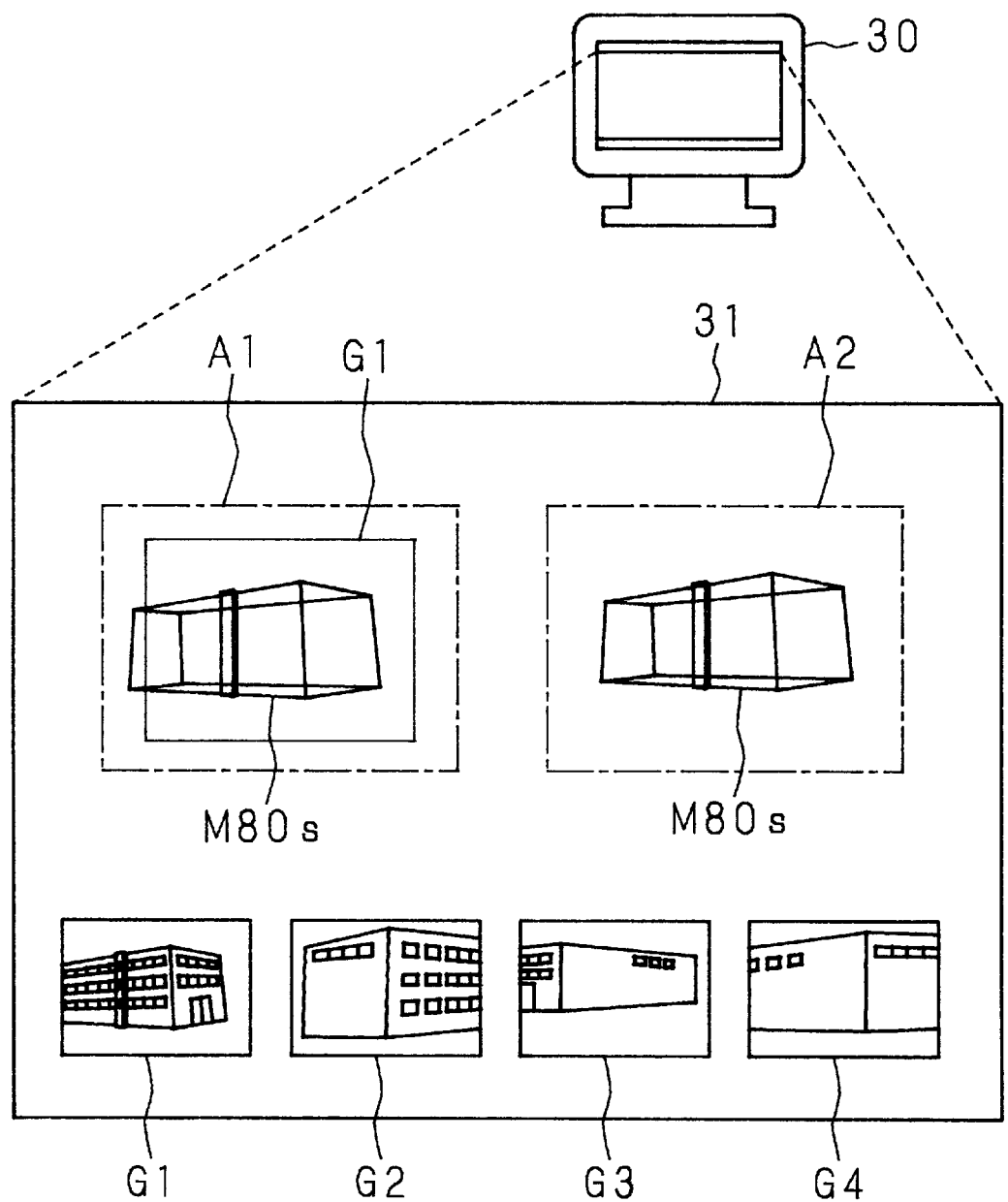
FIG. 18 is a view showing the contents which are displayed on a screen at the start of combining in the preferred embodiment.

FIG. 18 is a view showing the contents displayed in a principal portion of the display 30 at the beginning of combining. In reality, on the screen 31, there are regions displaying icons, messages, coordinates and the like.

When the operator designates combining, the model displaying part 121 displays a current object model M80s, which is a group of the two partial models M81 and M82 (i.e., combined model), as it is overlapped over the model image G1, within the first monitor region A1 (Step #105), whereas the combined model displaying part 128 displays the object model M80s as a target to be combined within a second monitor region A2. The second monitor region A2 is a window for combining. The symbol "s" denotes that the object model is a model before combining. The object model M80s within the first monitor region A1 accords with the model image G1.

In a lower half portion of the screen 31, four model images G1 to G4 read by the image reader 50 are arranged. The images G2 to G4 as well are pictures photographing the building 80.

Figure 19:
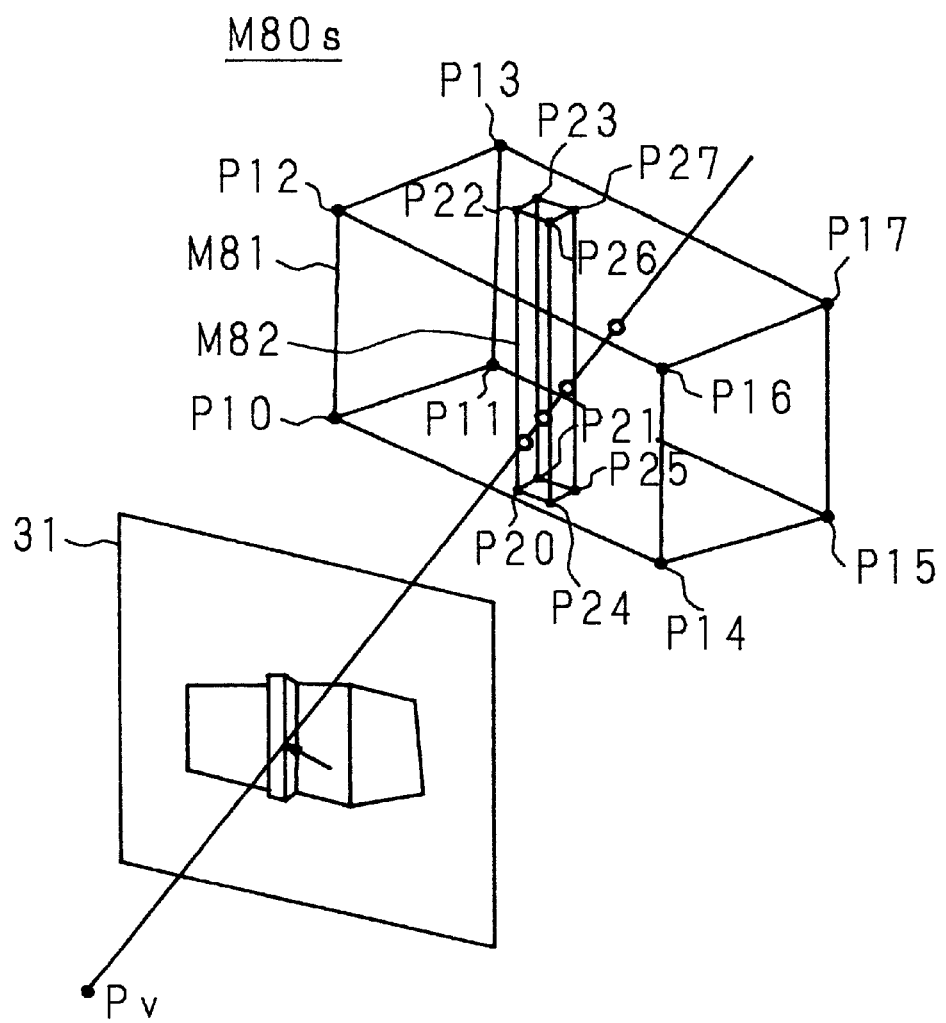
FIGS. 19 and 20 are views showing a positional relation between a cursor position and a partial element in the preferred embodiment.
Figure 20:
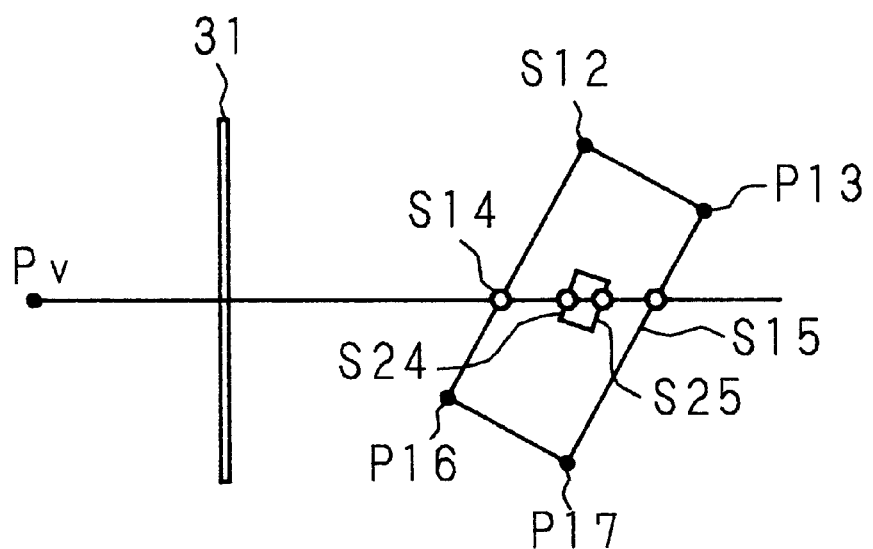
Figure 21:
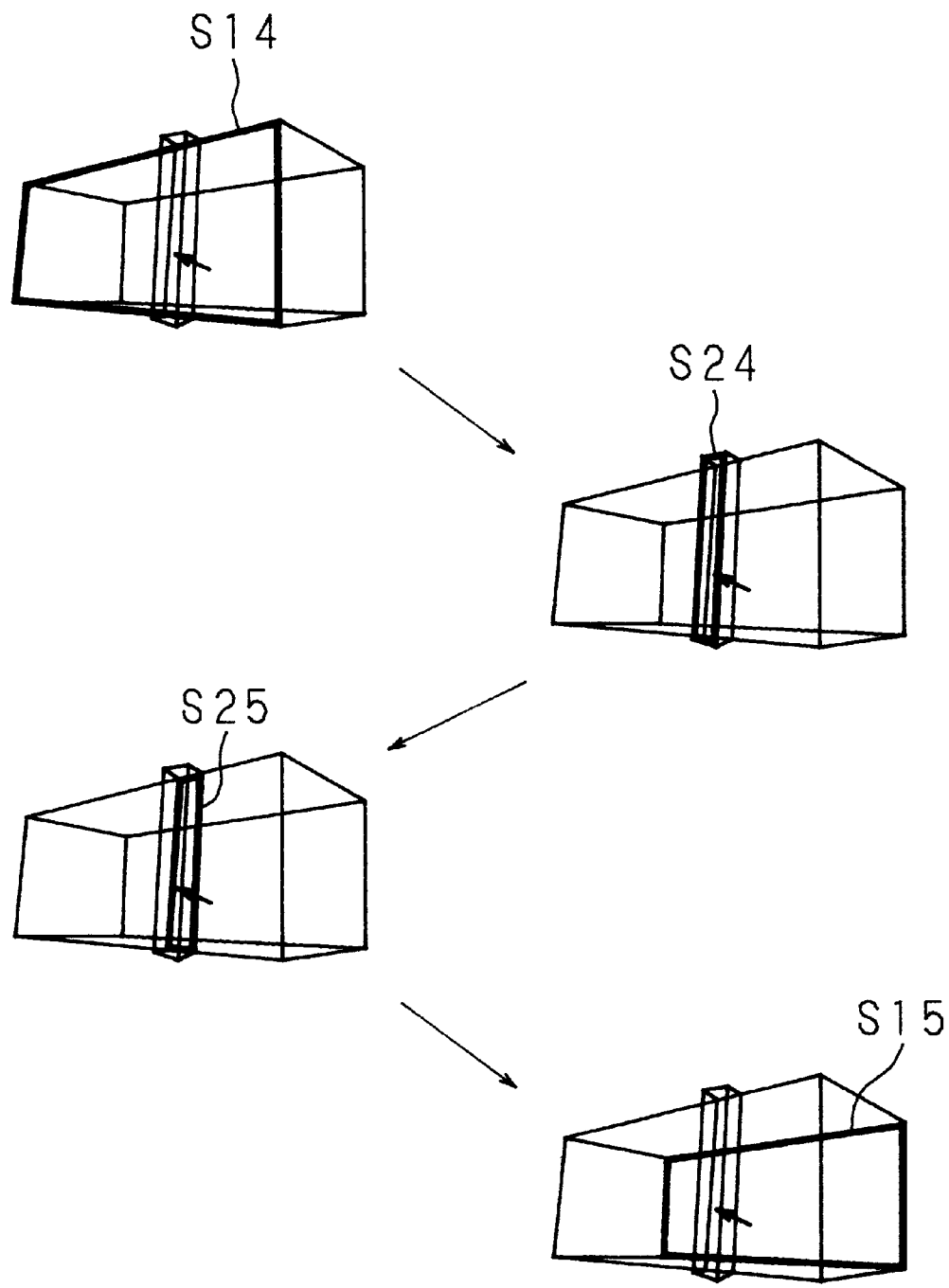
FIGS. 21 and 22 are views showing switching of a highlighting display in the preferred embodiment.
Figure 22:
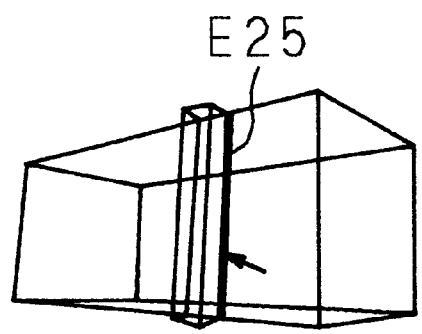

FIGS. 19 and 20 are views showing a positional relation between a cursor position and a partial element, and FIGS. 21 and 22 are views showing switching of a highlighting display.

In FIG. 19, the arrow within the screen 31 denotes the cursor position. Partial elements which exist on the line connecting the virtual point of view Pv and the cursor position are sequentially highlighted.

The object model M80s looks as if completed on the screen 31. However, the positional relation between the partial models M81 and M82 is not consistent with the building 80. In the example of FIG. 19, the partial model M82 exists within the partial model M81.

The partial elements which correspond to the cursor position are a surface S14 of the partial model M81, surfaces S24 and S25 of the partial model M82, and a surface S15 of the partial model M81. As shown in FIG. 21, the surface S14 which is closest the screen 31 of these surfaces is highlighted first. While highlighted portions are denoted by thick lines in FIG. 21, in reality, the highlighted portions are displayed in a color which is different from that for other portions. The entire surface S14 may be displayed with hatching.

When the surface S14 is highlighted first, the operator can grasp that the object model M80s is incomplete (Step #106).

If the object model M80s is complete, the surface S24 (outer surface of the stairs 82) must be highlighted first.

When the operator clicks, the surface S24 is highlighted, instead of the surface S14 (See FIG. 21). As clicking is repeated without changing the cursor position, a portion highlighted changes for every clicking in an order of surface S24, surface S25, surface S15 and surface S14.

When the cursor position is changed, a partial element which corresponds to the changed cursor position is highlighted. In FIG. 22, for example, a side E25 of the object model M82 is highlighted.

Figure 23:
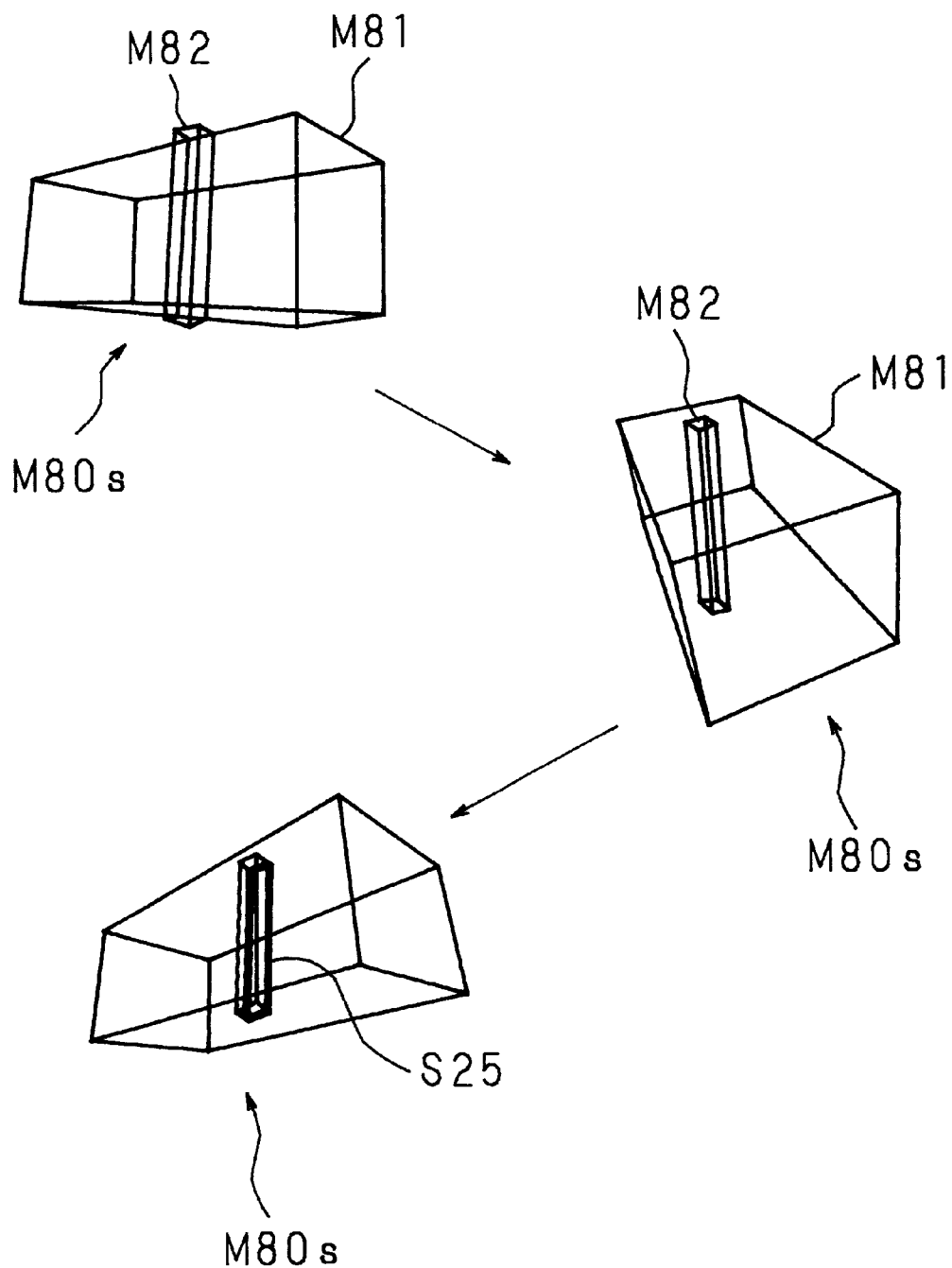
FIGS. 23 and 24 are views showing in order the contents which are displayed by combining operation in the preferred embodiment.
Figure 24:
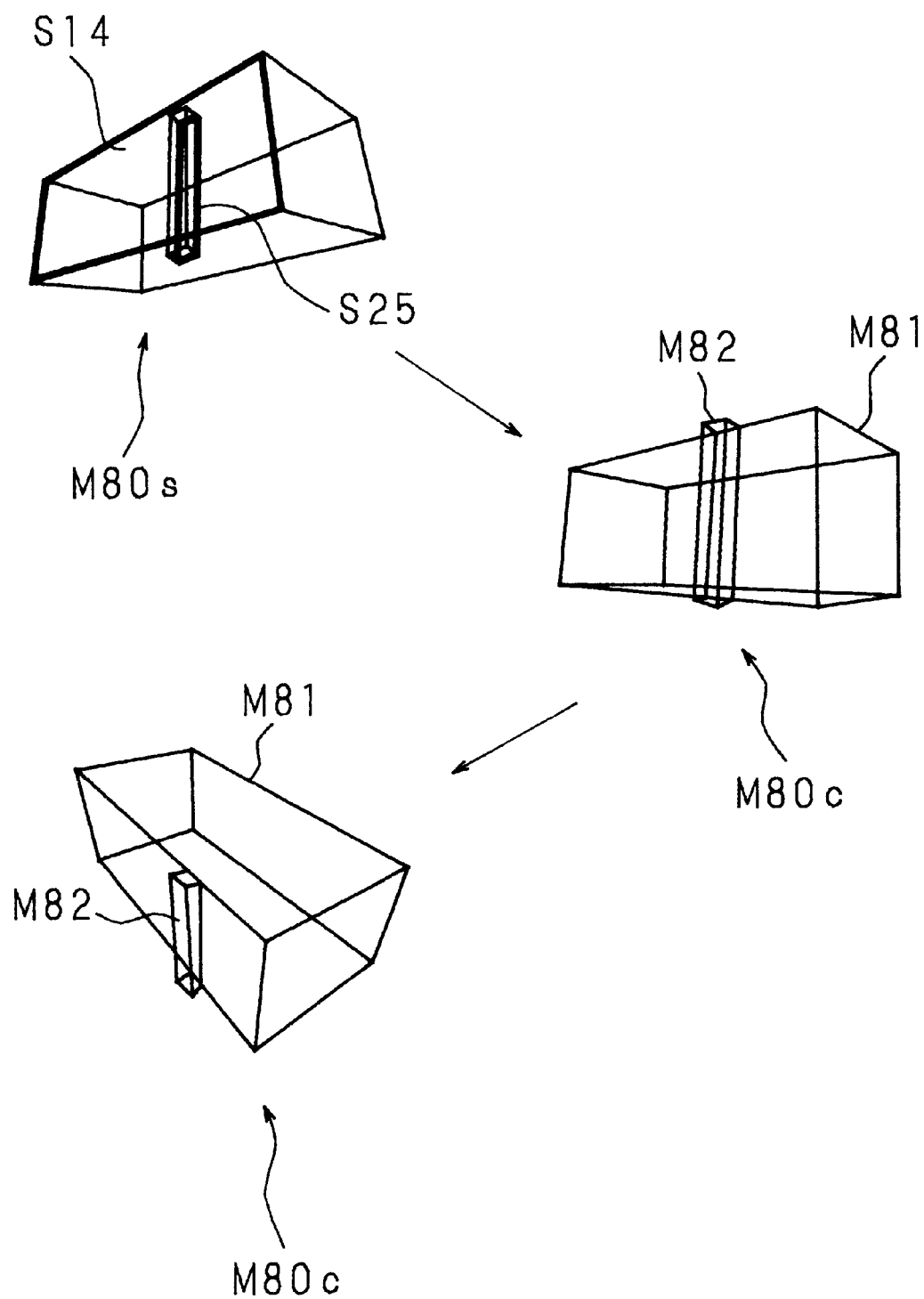

FIGS. 23 and 24 are views showing the contents which are displayed by means of combining.

In response to designation of the combining mode, the object model M80s is displayed within the second monitor region A2. By rotating the object model M80s (i.e., change in the posture), the positional relation between the partial models M81 and M82 is easily grasped.

Next, the posture of the object model M80s is changed for ease in designating a portion to be combined, if necessary, to designate a first portion to be combined (Step #107). As described above, the modelling system 1 performs combining which moves a partial model in which a portion to be combined is designated earlier. Which one of the partial models M81 and M82 is moved is optional. In most cases, however, it is better to fix a model in a portion which occupies a large area within the model image G1, since such makes the model image G1 unlikely to become conspicuous even when the model is displaced from the model image G1 as a result of combining. In the example of FIG. 23, the surface S25 of the object model M82 is designated as a first portion to be combined. The designated portion to be combined is highlighted with a different color from a highlighting color which was used during selecting before designating.

Following this, as shown in FIG. 24, a second portion to be combined is desiganted (Step #107). In the example of FIG. 24, the surface S14 of the partial model M81 is designated.

In response to designation of the second portion, computation for combining is executed (Step #108), whereby an object model M80c is created. The symbol "c" denotes that the object model is a model after combining. Since the conversion matrix as described above is used for combining, the posture of the object model M80c which is displayed within the second monitor region A2 is almost the same as that of the object model M80s before combining which is displayed within the first monitor region A1, regardless of the posture before combining.

By rotating the object model M80c within the second monitor region A2, it is possible to grasp that the partial models M81 and M82 are positioned correctly (Step #109). While the description above is related to a case where the object model M80c is created by combining for once, in reality, it is preferable that the operator gradually combines the partial models M81 and M82.

Figure 25:
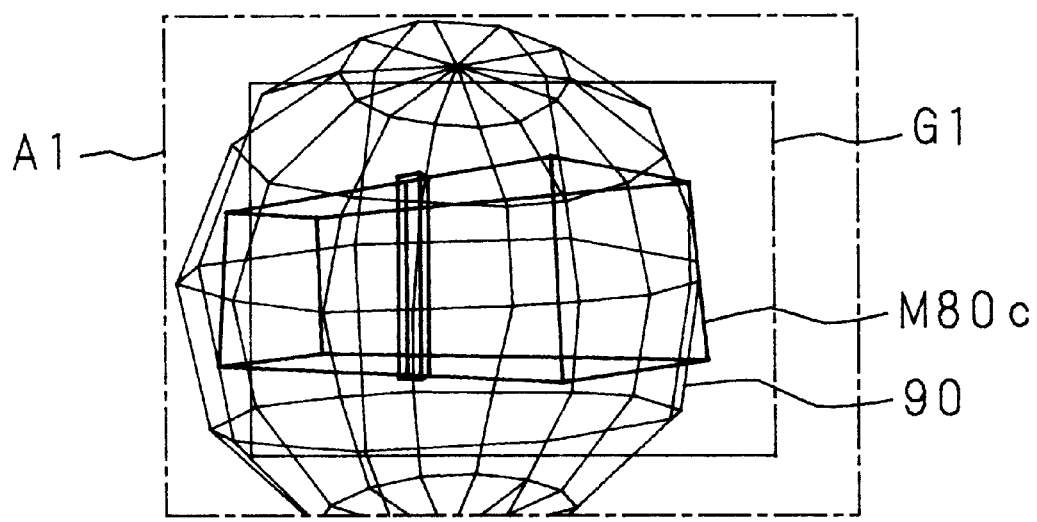
FIG. 25 is a view showing an example of a display within a first monitor region after combining in the preferred embodiment.

FIG. 25 is a view showing an example of a display within the first monitor region A1 after combining.

After completing the combining operation, the model managing part 131 updates the object model M80s into the object model M80c (Step #110). The model displaying part 121 displays the object model M80c over the model image G1 within the first monitor region A1, as the most recent model (Step #111).

Further, although the preferred embodiment of the present invention above is an example where the modelling system is applied to a computer system CS which includes a man-machine interface, a computer system incorporating a graphics circuit device may read a computer program from a readable medium (i.e., the computer memory product described above).

Figure 26:
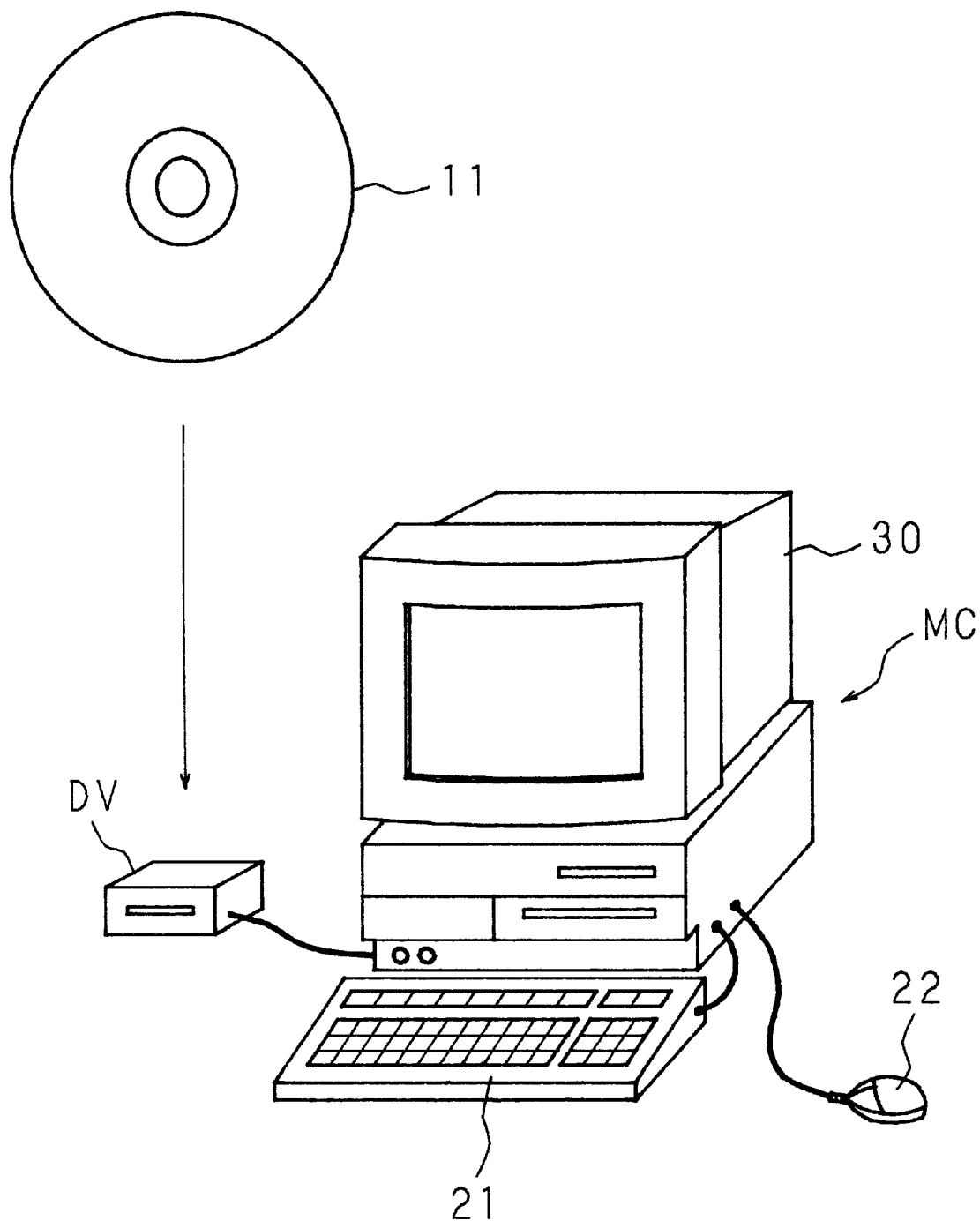
FIG. 26 is a schematic diagram of a readable medium recording a computer system and a computer program therefor which realize the modelling according to the present invention.

FIG. 26 is a schematic diagram showing the appearance of such a computer system MC and a readable medium 11. The readable medium 11 is inserted into a disk drive DV which is connected to the computer system MC. Operations after the computer program is loaded in the computer system MC from the readable medium 11 through the disk drive DV are exactly the same as those in the example described earlier with reference to FIG. 2.

As described above, according to the modelling method and the computer memory product of the present invention, it is possible to create a complex model of a three-dimensional configuration in an easy manner while utilizing a two-dimensional image such as a real image.

Further, it is possible to create a desired model by less frequent modelling.

Still further, according to the modelling system of the present invention, it is possible to realize an operation environment for creating a complex model in an easy manner while utilizing a two-dimensional image such as a real image.

Further, it is possible to realize an operation environment for creating a desired model by less frequent modelling, and to designate a portion to be combined easily and efficiently.

Further, it is possible to enhance the perfectness of a model quickly, utilizing a plurality of two-dimensional images.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A modelling method for creating a three-dimensional model of an object in a screen, comprising the steps of:

positioning a two-dimensional image within a virtual three-dimensional space, the two-dimensional image corresponding to a real three-dimensional object;

dividing said two-dimensional image into plural portions;

positioning first and second existing models within a virtual three-dimensional space, the first and the second existing models corresponding to one and the other of said portions of said two-dimensional image;

creating a first partial model and a second partial model by correcting said first and said second existing models so that a projection image of each of said first and said second existing models accords with each of said portions of said two-dimensional image; and combining said first partial model and said second partial model so that projection images of said first partial model and said second partial model accord with the two-dimensional image of said real three-dimensional object.

2. The modelling method according to claim 1, wherein during said step of combining, said first and said second partial models are moved relative to each other within said virtual three-dimensional space.

3. The modelling method according to claim 2, wherein during said step of combining, said first partial model is fixed and said second partial model is moved.

4. The modelling method according to claim 3, wherein during said step of combining, said first partial model is moved so that a point, a line and a surface of said first partial model are integrated into corresponding portions of said second partial model in order.

5. The modelling method according to claim 4, wherein during said step of combining, a history of combining is stored and combining processes are performed in turn while maintaining the combining relation based on the history.

6. A modelling system for creating a three-dimensional model of an object in a screen, comprising:

first monitor display control means for positioning in a virtual three-dimensional space a two-dimensional image including three-dimensional structure information regarding the object, a first partial model which is a model of a first portion of said object, and a second partial model which is a model of a second portion of said object, to thereby display a mutual positional relation thereof within a first region on said screen; and model combining means for combining said first and said second partial models so that given combining requirements are satisfied and so that said first and said second partial models are combined into a model of said two-dimensional image with no change in the position of said two-dimensional image.

7. The modelling system according to claim 6, further comprising restraint generating means for storing said combining requirements, wherein said model combining means combines said first and said second partial models so that a combining requirement which is designated by said restraint generating means is satisfied.

8. The modelling system according to claim 6, further comprising second monitor display control means for displaying the positional relation between said first and said second partial models which are combined with each other by said model combining means within a second region on said screen which does not overlap said first region.

9. The modelling system according to claim 6, further comprising guide display control means for highlighting the partial element with is selected from partial elements of said first and said second partial models in accordance with a combining requirement, one by one in order every time the selecting of the partial element is performed.

10. The modelling system according to claim 6, further comprising:

image memory means for storing a plurality of the two-dimensional images which contain different information from one another;

image displaying means for arranging and displaying said two-dimensional images on said screen; and image selecting means for selecting one of said two-dimensional images as an image to be displayed within said first region, in accordance with an instruction being inputted.

11. A computer memory product for creating a three-dimensional model of an object in a screen, readable by a computer, containing a program, said program comprising the steps of:

positioning a two-dimensional image within a virtual three-dimensional space, the two-dimensional image corresponding to a real three-dimensional object;

dividing said two-dimensional image into plural portions;

positioning first and second existing models within a virtual three-dimensional space, the first and the second existing models corresponding to one and the other of said portions of said two-dimensional image;

creating a first partial model and a second partial model by correcting said first and said second existing models so that a projection image of each of said first and said second existing models accords with each of said portions of said two-dimensional image; and combining said first partial model and said second partial model so that projection images of said first partial model and said second partial model accord with the two-dimensional image of said real three-dimensional object.

12. The computer memory product according to claim 11, wherein during said step of combining, said first and said second partial models are moved relative to each other within said virtual three-dimensional space.

13. The computer memory product according to claim 12, wherein during said stop of combining, said first partial model is fixed and said second partial model is moved.

14. The computer memory product according to claim 13, wherein during said step of combining, said first partial model is moved so that a point, a line and a surface of said first partial model are integrated into corresponding portions of said second partial model in order.

15. The computer memory product according to claim 14, wherein during said step of combining, a history of the combining is stored and combining processes are performed in turn while maintaining the combining relation based on the history.

16. A computer memory product for creating a three-dimensional model of an object in a screen, having computer readable program code means, said computer readable program code means comprising:

first computer readable program code means for causing said computer to position a two-dimensional image within a virtual three-dimensional space, the two-dimensional image corresponding to a three-dimensional object;

dividing said two-dimensional image into plural portions;

positioning first and second existing models within a virtual three-dimensional space, the first and the second existing models corresponding to one and the other of said portions of said two-dimensional image;

second computer readable program code means for causing said computer to create a first partial model and a second partial model by correcting said first and said second existing models so that a projection image of each of said first and said second existing models accords with each of said portions of said real three-dimensional object; and third computer readable program code means for causing said computer to combine said first partial model and said second partial model so that projection images of said first Partial model and said second partial model accord with the two-dimensional image of said real three-dimensional object.

17. The computer memory product according to claim 16, wherein said third computer readable program code means moves said first and said second partial models relative to each other within said virtual three-dimensional space.

18. The computer memory product according to claim 17, wherein said third computer readable program code means fixes said first partial model and moves said second partial model.

19. The computer memory product according to claim 18, wherein said third computer readable program code means moves said first partial model so that a point, a line and a surface of said first partial model are integrated into corresponding portions of said second partial model in order.

20. The computer memory product according to claim 19, wherein said third computer readable program code means stores a history of the combining and performs combining processes in turn while maintaining the combining relation based on the history.

21. A method for creating a three-dimensional model, comprising the steps of:

positioning a two-dimensional image within a virtual three-dimensional space, the two-dimensional image corresponding to a three-dimensional object;

dividing said two-dimensional image into plural portions;

positioning first and second existing models within a virtual three-dimensional space, the first and the second existing models corresponding to one and the other of said portions of said two-dimensional image;

creating a first partial model of a first portion of said three-dimensional object and a second partial model of a second portion of said three-dimensional object in accordance with a projection image of said first and second partial models; and combining said first partial model and said second partial model and projecting the combined models into said two-dimensional image with no change in the position of the two-dimensional image.

* * * * *

UNITED STATES PATENT AND TRADEMARK OFFICE
CERTIFICATE OF CORRECTION

PATENT NO. : 6,040,836
DATED : March 21, 2000
INVENTOR(S) : Shuichi SHIITANI, et al.

It is certified that error appears in the above-indentified patent and that said Letters Patent is hereby corrected as shown below:

Col. 13, line 41, change "with" to --which--.

Col. 14, line 35, after "a" insert --real--.

Col. 14, lines 47-48, change "real three-dimensional object" to --two-dimensional image--.

Col. 14, line 52, change "Partial" to --partial--.

Signed and Sealed this

Twentieth Day of March, 2001

Attest:

NICHOLAS P. GODICI

Attesting Officer      Acting Director of the United States Patent and Trademark Office